United States Patent
Naito et al.

(10) Patent No.: US 9,225,211 B2
(45) Date of Patent: Dec. 29, 2015

(54) ROTOR STRUCTURE FOR ELECTRIC MOTOR

(75) Inventors: Yoshiharu Naito, Tokyo (JP); Koji Nagata, Tokyo (JP)

(73) Assignee: MEIDENSHA CORPORATION, Tokyo (JP)

( * ) Notice: Subject to any disclaimer, the term of this patent is extended or adjusted under 35 U.S.C. 154(b) by 285 days.

(21) Appl. No.: 13/881,991

(22) PCT Filed: Oct. 17, 2011

(86) PCT No.: PCT/JP2011/073790
§ 371 (c)(1),
(2), (4) Date: Jul. 16, 2013

(87) PCT Pub. No.: WO2012/056921
PCT Pub. Date: May 3, 2012

(65) Prior Publication Data
US 2013/0293057 A1    Nov. 7, 2013

(30) Foreign Application Priority Data
Oct. 29, 2010   (JP) .................... 2010-243107

(51) Int. Cl.
*H02K 1/06*  (2006.01)
*H02K 1/28*  (2006.01)
*H02K 1/27*  (2006.01)

(52) U.S. Cl.
CPC . *H02K 1/28* (2013.01); *H02K 1/276* (2013.01)

(58) Field of Classification Search
USPC .................. 310/216.123, 156.09, 216.121
See application file for complete search history.

(56) References Cited

U.S. PATENT DOCUMENTS

| 4,720,649 A | * | 1/1988 | Habermann et al. | .......... 310/90.5 |
| 4,833,353 A | * | 5/1989 | Hansen | .................... 310/51 |
| 4,841,186 A | * | 6/1989 | Feigel et al. | ............. 310/156.12 |
| 4,881,002 A | * | 11/1989 | Yamaguchi | ........... 310/216.092 |
| 4,987,330 A | * | 1/1991 | Murphy et al. | ............... 310/211 |
| 5,542,832 A |   | 8/1996 | Sone et al. | |
| 7,466,054 B2 | * | 12/2008 | Watson et al. | ........... 310/156.08 |

(Continued)

FOREIGN PATENT DOCUMENTS

| JP | 07-269478 | 10/1995 |
| JP | 11-289729 A | 10/1999 |

(Continued)

OTHER PUBLICATIONS

Japanese Office Action dated Jul. 15, 2014, 5 pgs.

(Continued)

*Primary Examiner* — Thanh Lam
(74) *Attorney, Agent, or Firm* — Foley & Lardner LLP (57) ABSTRACT

A rotor structure for a rotary machine in which a rotor (10) is securely fastened to the outer periphery of a shaft (20) and a positioning key is formed on the inner wall of the rotor (10), while a key (11) is formed on the outer periphery of the shaft (20), wherein curved sections (R) are formed on the side surfaces on both sides of the positioning key (11), thereby reducing stress at the angled sections of the rotor core to a greater extent than positioning keys of the prior art. At the same time, torque can be transmitted over the entire surface of an interference section of the shaft (20) thereby enabling torque to be reliably transmitted, and a magnetic path of a magnetic protrusion (d-axis) to be ensured. A motor can thus be reduced in size.

7 Claims, 7 Drawing Sheets

(56) References Cited

U.S. PATENT DOCUMENTS

2007/0103023 A1* 5/2007 Tapper .................... 310/156.19
2010/0013350 A1    1/2010 Fu

FOREIGN PATENT DOCUMENTS

| | | |
|---|---|---|
| JP | 2004-032943 | 1/2004 |
| JP | 2008-187804 | 8/2008 |
| JP | 2008-312321 | 12/2008 |
| WO | WO2008/093622 | 8/2008 |

OTHER PUBLICATIONS

International Search Report and Written Opinion mailed Dec. 13, 2011 in PCT/JP2011/073790 with English-language translation of ISR (10 pgs.).

* cited by examiner

ROTOR STRUCTURE FOR ELECTRIC MOTOR

FIELD OF THE INVENTION

The invention relates to a rotor structure of an electric motor in which a rotor and a shaft are fastened with interference section. Particularly, the invention relates to a structure of a rotary machine for positioning the shaft with respect to the rotor so as to release stress force effectively and improve fastening force between them.

BACKGROUND OF THE INVENTION

Figure 6:
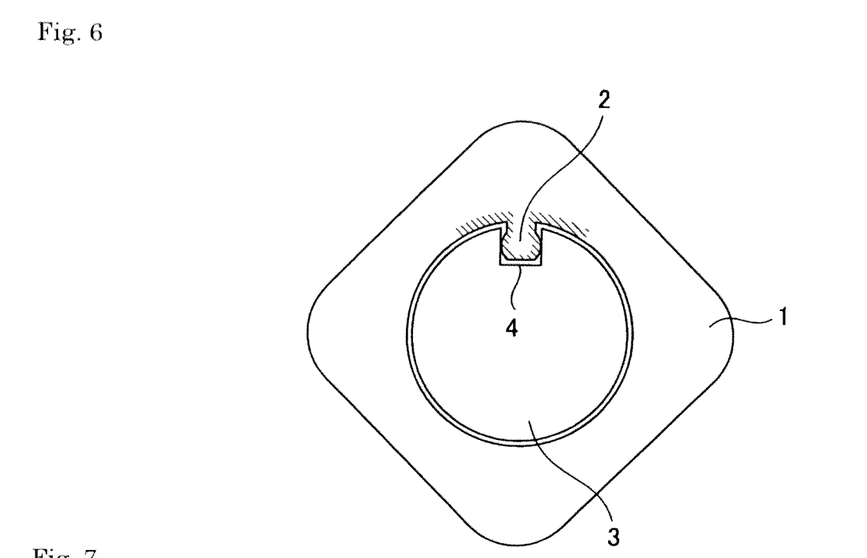
FIG. 6 is a front view of a rotor structure (Part 1) of a conventional rotary machine.

In a conventional art as shown in FIG. 6, it has been known a conventional positioning structure in which a key member 2 is fitted into a key groove 4 wherein the key member (convex portion) 2 extending toward a center of the rotor is formed at an inner wall of the rotor 1 and the key groove (concave portion) 4 extending toward a center of the shaft is formed. (See FIG. 2 of the Patent document 1)

Figure 7:
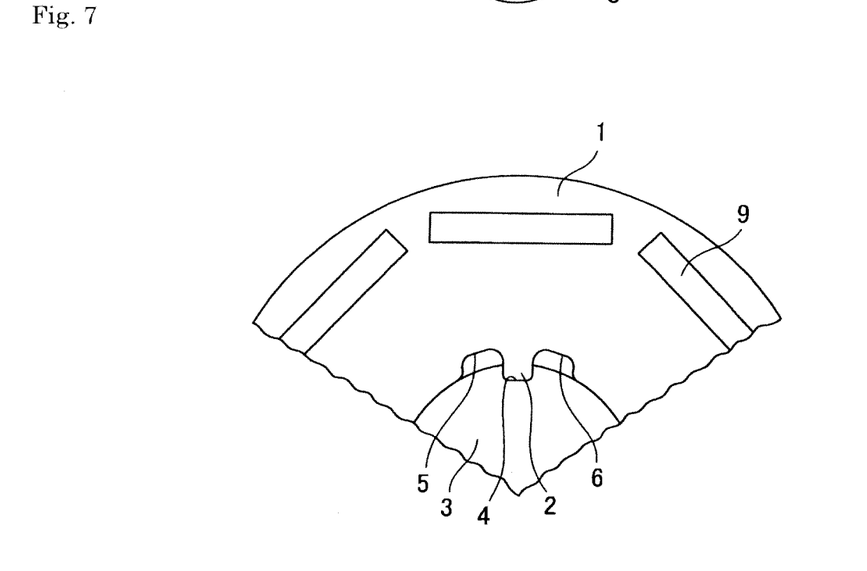
FIG. 7 is a front view of a rotor structure (Part 2) of a conventional rotary machine.
Figure 8:
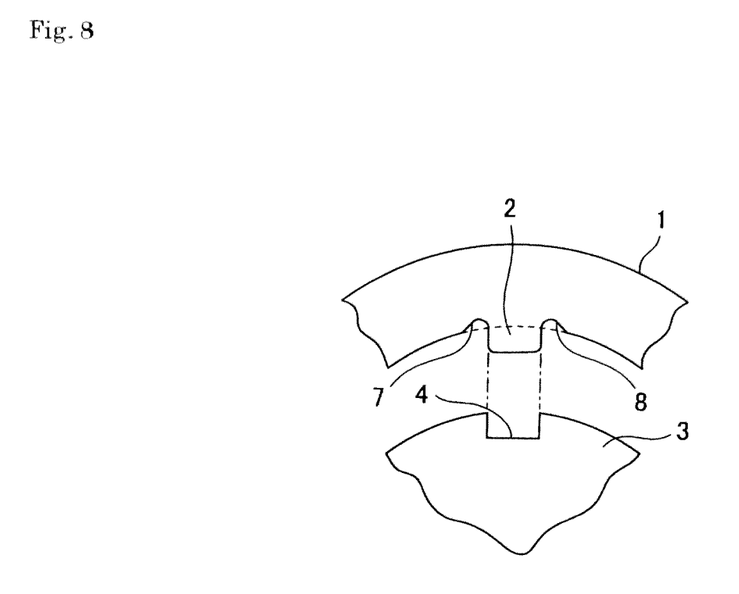
FIG. 8 is a front view of a rotor structure (Part 3) of a conventional rotary machine.

As an improvement of the conventional art, a structure as shown in FIG. 7 in which stress damping grooves 5, 6 is provided at the both sides of the key member 2, respectively (See FIG. 4 of the Patent document 2) and a structure as shown in FIG. 8 in which concave portions 7, 8 is provided at the both sides of the key member 2, respectively (See FIG. 6 of the Patent document 3) have been known.

In case of such a positioning structure, if an electric motor is a PM motor, it is necessary to determine a position of each a magnet embedded at a rotor core and a position of a revolution sensor connected to a shaft so as to control driving force produced by the electric motor.

PRIOR ART DOCUMENT

Patent Document

Patent document 1: Japanese Patent Un-examined Publication No. 2004-32943
Patent document 2: Japanese Patent Un-examined Publication No. 2008-187804
Patent document 3: Japanese Patent Un-examined Publication No. 2008-312321

SUMMARY OF THE INVENTION

Subject to be Solved by the Invention

Figure 9:
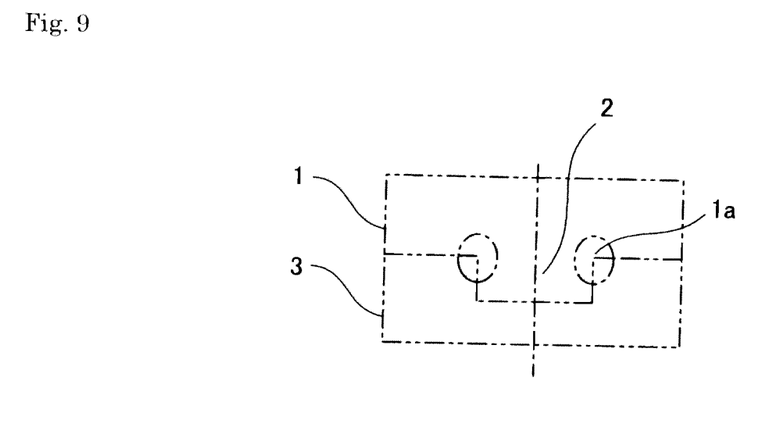
FIG. 9 shows how stress force is concentrically applied to a corner portion of a core of a rotor.

In an electric motor, a torque force from a rotor core to a shaft is transmitted through interference section between the rotor core and the shaft. As shown in FIG. 9, the torque force is transmitted from the rotor core (rotor) to the shaft 3 by fitting the shaft 3 into the rotor wherein interference section is provided between the shaft 3 and the rotor core 1 so as to be fastened each other. Under the structure, stress force is concentrically applied to a corner portion 1a of the rotor core 1 as shown in a chain line in FIG. 9.

In order to avoid for concentrically applying the stress force on the corner portion, each concave portion (hereinafter, it is referred as "round portions") R is provided at the corner portion, respectively. However, a fasten area between the inner wall of the rotor core and the outer peripheral wall of the shaft is becomes narrower by providing the round portions R. Thus, a problem that the transmitting torque force is weakened is newly happened.

Round portions R is provided at the inner wall of the rotor confronting with the both sides of the positioning key 2, respectively. The round portion R is a semi circular concave portion of which a curved surface is caved toward outwardly along a radius direction (upper direction in FIG. 10). The longer a length L along a peripheral direction at a bottom surface of the Round portion R becomes, the smaller a fasten area between the rotor core 1 and the shaft 3 becomes.

Figure 10:
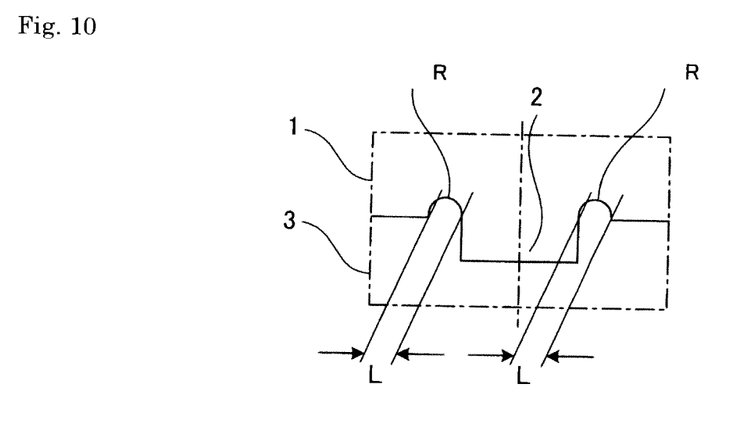
FIG. 10 shows an improved core portion of a rotor wherein a curved portion R is provided at a core portion.

In order to strengthen the torque force, it is necessary to widen interference section. However, if the interference section becomes wider, tensile force applied on the Round portion R is strengthened. In order to damp such tensile force, it is necessary to elongate a radius of the Round portion R. Therefore, the length L along the peripheral direction at the bottom surface of the Round portion R becomes longer and then the fasten area is further narrower.

Figure 11:
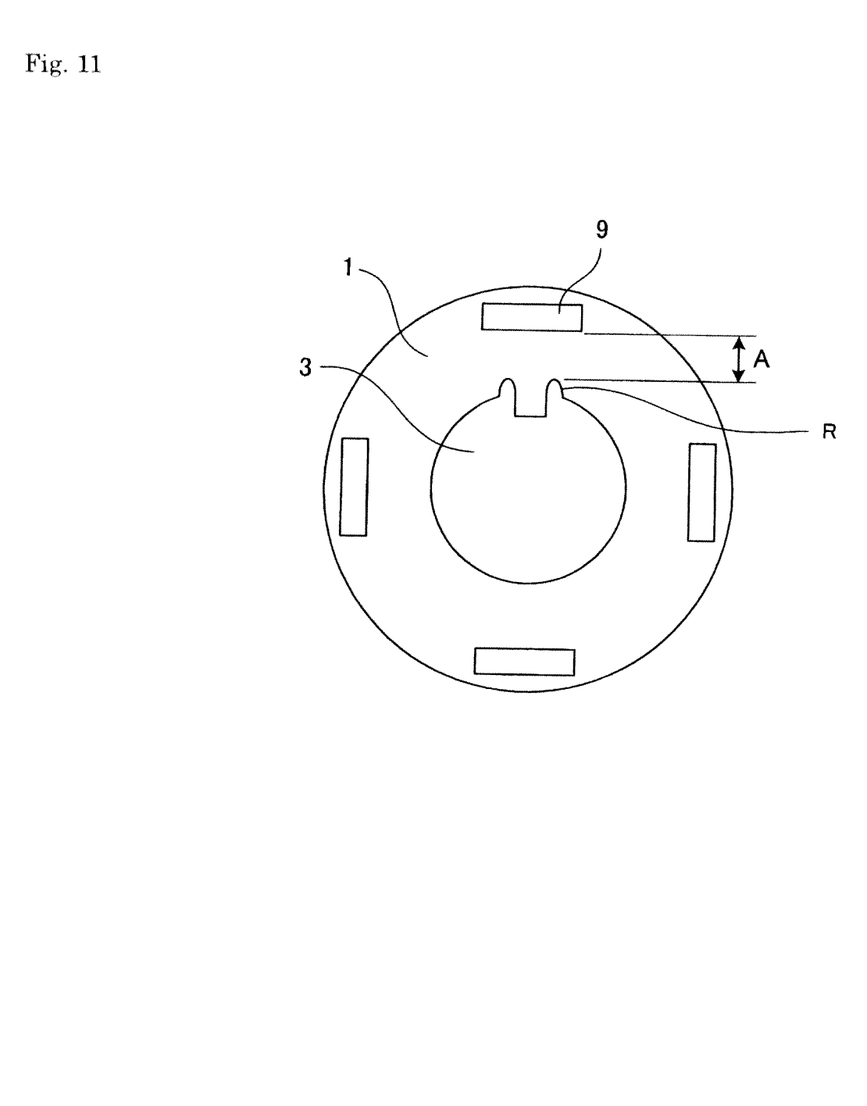
FIG. 11 shows a groove is provided at a magnetic protruded portion (d-axis) at an outer peripheral side of an inner surface of a rotor along a radius direction by providing the curved portion R.

In the case of the PM motor as shown in FIG. 11, permanent magnets 9 embedded at the rotor make magnetic field. Magnetic convex portions of which a magnetic resistance is relatively small and though which magnetic flux is passed relatively easily (hereinafter, it is referred as "d-axis") and magnetic concave portions of which the magnetic resistance is relatively large and through which magnetic flux is passed relatively difficulty (hereinafter, it is referred as "q-axis") are alternatively arranged along a peripheral direction of the rotor. Magnetic flux between a stator (not shown) and the rotor becomes higher at the magnetic convex portions (d-axis) and lower at the magnetic concave portions (q-axis). As the result, reluctance torque is occurred due to a variation of such a magnetic flux density.

In a conventional art, if the Round portions R are provided so as to damp a concentration of stress force, a concave has to be provided at the magnetic convex portion (d-axis) at an outer peripheral side of the inner wall of the rotor along a radius direction. In order to maintain a certain cross section area of the magnetic path at the magnetic convex portions (d-axis), a diameter of the rotor has to become longer. Therefore, there is a problem that the PM motor cannot be down sized.

A mark A in FIG. 11 shows why a diameter of the rotor has to be large since a certain cross section area of magnetic path has to be maintained while the Round portions R are protruded in the magnetic convex portion (d-axis).

Means to Solve the Subject

In order to solve the above subject, a rotor structure of a rotary machine according to the present invention as recited in claim 1 comprises a rotor fastened at an outer peripheral surface of a shaft, a positioning key formed at an inner wall of the rotor and a key groove into which the positioning key is fitted formed at an outer peripheral surface of the shaft, wherein the rotor structure is characterized in that concave portions is formed with respect to the both sides of the positioning key, respectively.

In order to solve the above subject, a rotor structure of a rotary machine according to the present invention as claimed in claim 2 is characterized in that the groove is formed at the inner wall of the rotor confronting with a respective side of the positioning key.

Effect of the Invention

In accordance with the invention, concave portions are formed at the both side surfaces of the positioning key, respectively. Upon comparing with the positioning key according to the present invention and the conventional positioning key, torque force is certainly transmitted with an entire surface of the interference section of the shaft while the stress force applied to a corner portion of the rotor core is damped. Further, the magnetic path of the magnetic convex portion (d-axis) is certainly maintained so that a motor can become compact.

Even if a radius of the Round portion R is elongated while the interference section is enlarged, a certain torque force can be transmitted without narrowing the fasten cross section area of the outer peripheral surface of the shaft and the inner wall of the rotor. A diameter of the rotor is unnecessary to become longer without narrowing the magnetic path of the magnetic convex portion (d-axis), the motor can become compact.

EMBODIMENT OF THE INVENTION

The embodiments of the present invention will be described as described below.

Embodiment 1

Figure 1:
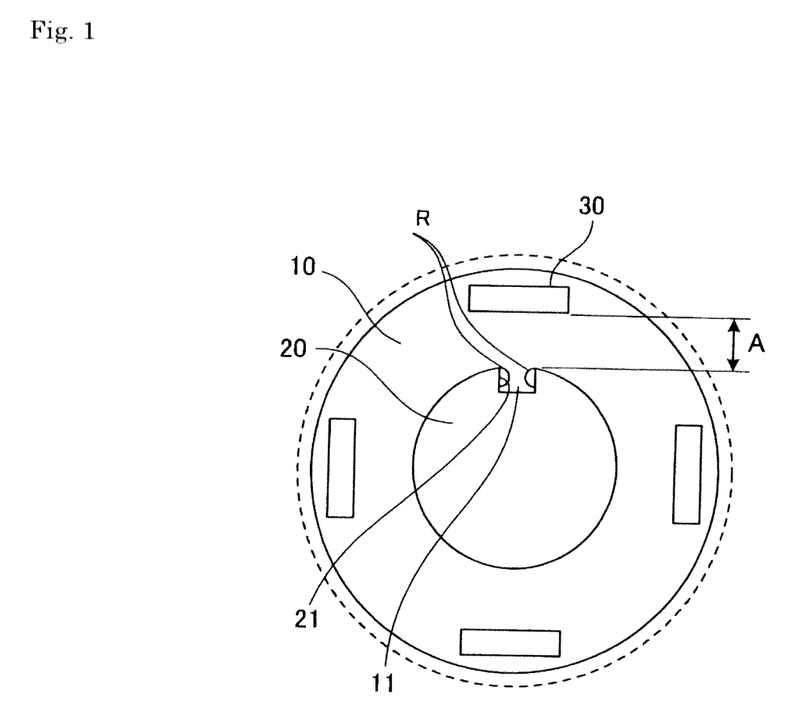
FIG. 1 is a front view of a rotor structure of a rotary machine according to the first embodiment of the present invention.

FIG. 1 is a front view of a rotor structure of a rotary machine according to the first embodiment of the present invention.

As shown in the drawing, a rotor core (rotor) 10 is fitted at an outer peripheral surface of a shaft 20. Permanent magnets 30 are embedded at four portions in the rotor core 10.

At an inner wall of the rotor core 10, a positioning key 11 is formed toward a center of the rotor and arranged along an axial direction. A key groove 21 into which the positioning key is fitted is formed at an outer peripheral wall of the shaft 20.

The positioning key 11 is a convex portion protruded toward an inner peripheral side of the inner wall of the rotor along a radius direction and a cross section of the positioning key 11 is a rectangular shape. The positioning key 21 is a concave portion at an outer peripheral wall of the shaft 20 and extending toward a center of the shaft along an axial direction and a cross section of the positioning key 21 is a rectangular shape.

Under the positioning structure of an embodiment according to the present invention, a concave portion is not formed at a magnetic convex portion (q-axis) at an outer peripheral side of the rotor inner wall along a radius direction and concave portions (hereinafter, it is referred as a Round portion) R are symmetrically arranged at the both side surfaces of the positioning key 11, respectively.

That is, the Round portion R is a semi-circular shape and deeply caved from one side of the positioning key 11 to the opposite side thereof. The Round portion R is not extended outwardly over a line of the outer peripheral surface (upper direction in FIG. 1) of the shaft 20. A semi-circular portion of the Round portion R is confronting with a center of the positioning key 11. A straight portion of the Round portion R is confronting with the key groove 21.

Figure 2:
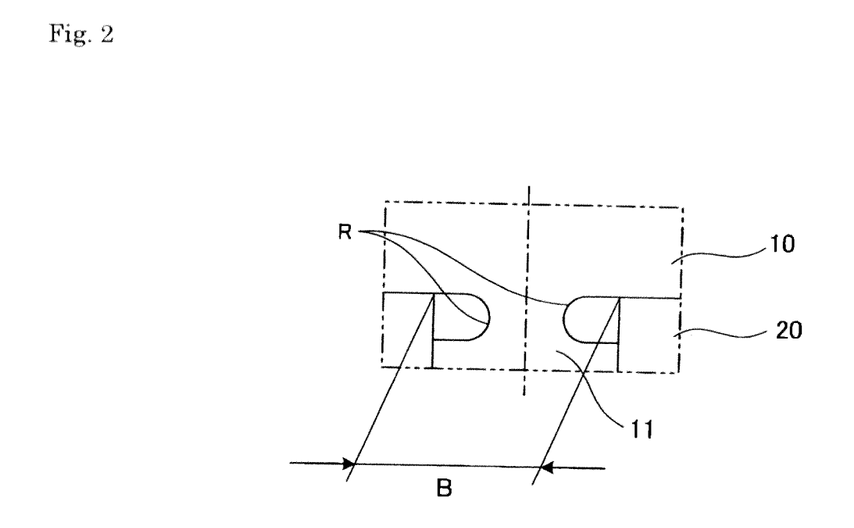
FIG. 2 is an enlarged view of a curved portion R (small radius of curvature).
Figure 3:
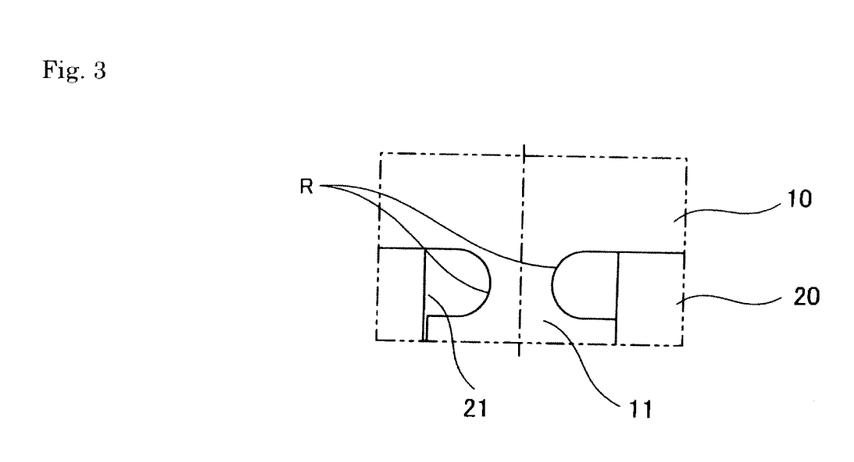
FIG. 3 is an enlarged view of a curved portion R (large radius of curvature).

FIG. 2 and FIG. 3 show an enlarged view of the Round portions, respectively. Upon comparing with the Round portion R as shown in FIG. 3 and the Round portion as shown in FIG. 2, a radius of curvature of the Round portion R as shown in FIG. 3 is larger than that as shown in FIG. 2. Under the structure that a radius of the Round portion R as shown in FIG. 3 is larger than that of the Round portion as shown in FIG. 2, a concentration of the stress applied can be damped even if the stress force applied to the corner portion of the rotor is strengthened.

In the first embodiment, the Round portions R of the rotor core 10 is provided with respect to the both sides of the positioning key 11, respectively. While the concentration of the stress applied at the corner portion of the rotor core is damped, interference section can be provided at the entire outer peripheral surface of the shaft 20 (excluding the outer peripheral surface B corresponding to the key groove of the shaft 20) so as to transmit torque force.

There is no concave portion of the Rounding portion R at the magnetic convex portion (d-axis) at the outer peripheral side of the inner wall of the rotor along the radius direction so that the cross section area of the magnetic path of the magnetic convex portion (d-axis) need not be smaller than that in the conventional structure as shown in FIG. 11. Thus, the motor can be down sized in the present invention.

In the case of the PM motor, even if the interference section is larger and the diameter of the Round portion R becomes longer, a cross sectional area of the outer peripheral surface of the shaft and an inner wall of the rotor need not be smaller and a cross sectional area of the magnetic path at the magnetic convex portion (d-axis) need not be smaller. Even if the Round portion R becomes large, a certain torque force can be transmitted. Thus, the motor can be down sized.

Particularly, the Round portion has no concave at an outer peripheral side of the inner wall of the rotor along the radius direction so that a diameter of the rotor can be smaller than that of the conventional structure. As shown in FIG. 1, a concave of the Round portion R is not provided at an inner wall of the rotor at the outer peripheral side. A rotor of a diameter of the embodiment according to the present invention can be smaller than that of a conventional structure as shown a dashed line in FIG. 1. Thus, the motor can be down sized.

As described above, in the first embodiment, Round portions R of the rotor core 10 is provided with respect to the both sides of the positioning key 11, respectively. Upon comparing with a conventional positioning key and the positioning key according to the present invention, torque force can be certainly transmitted through an entire surface of the interference section of the shaft while a concentration of the stress applied on the corner portion of the rotor core can be damped in the present invention. Further, the magnetic path of the magnetic convex portion (d-axis) can be maintained so that the motor can be down sized.

Even if the radius of the Round portion R is elongated by widening the interference section, a cross section area of the outer peripheral surface of the shaft and inner wall of the rotor need not be smaller and a large amount of the torque force can be transmitted. Further, a magnetic path of the magnetic convex portion (d-axis) is not smaller. Thus, the motor can be down sized while the diameter of the rotor need not become longer.

Embodiment 2

Figure 4:
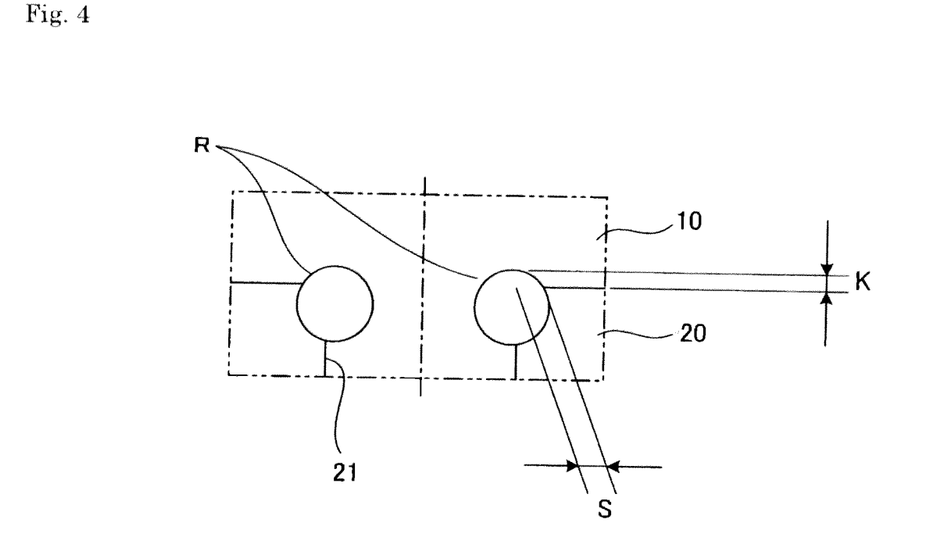
FIG. 4 is a front view of a rotor structure (essential part) of a rotary machine according to the second embodiment of the present invention.

A structure of the rotor of the rotary machine of the second embodiment according the present invention is shown in FIG. 4. In the second embodiment, a position of a Round portion is shifted to an upper portion (in the drawing) compared to the position of the Round portion in the first embodiment.

If a large amount of torque force is necessary, a radius of curvature of the Round portion R has to be larger as shown in FIG. 3. Thus, a dumping effect of the Round portion as shown in FIG. 3 is larger than that as shown in FIG. 2 and the interference section according to the second embodiment can become larger than that according to the first embodiment. However, a number of manufacturing steps is larger, since a depth of the key groove becomes deeper.

In the second embodiment, while the radius of the curvature of the Round portion R becomes longer, the position of the Round portion R is shifted to an upper location comparing with the position of the Round portion R according to the first embodiment so as to avoid for not deepening a depth of a key groove.

Practically, the Round portion R is a circular shape of which a curvature is gradually caved from one side of the positioning key 11 to the opposite side of the positioning key 11. The curvature is deeply curved over a line of the outer peripheral surface of the shaft 20 (an upper side in the drawing). The Round portion R is a curvature shape for pushing an upper end of the key groove 21 of the shaft 20 outwardly. At a corner portion of the rotor core, the Round portion R is circularly arranged at a boundary portion between the upper end portion of the key groove 21 and a root portion of the positioning key 11. Thus, the Round portion R according to the second embodiment has a cave K at the magnetic convex portion (d-axis), that is, the inner wall of the rotor at an outer peripheral side along a radius direction and a width S for widening the key groove 21 along the inner wall of the rotor. Those points of the second embodiment are different those of the first embodiment.

Figure 5:
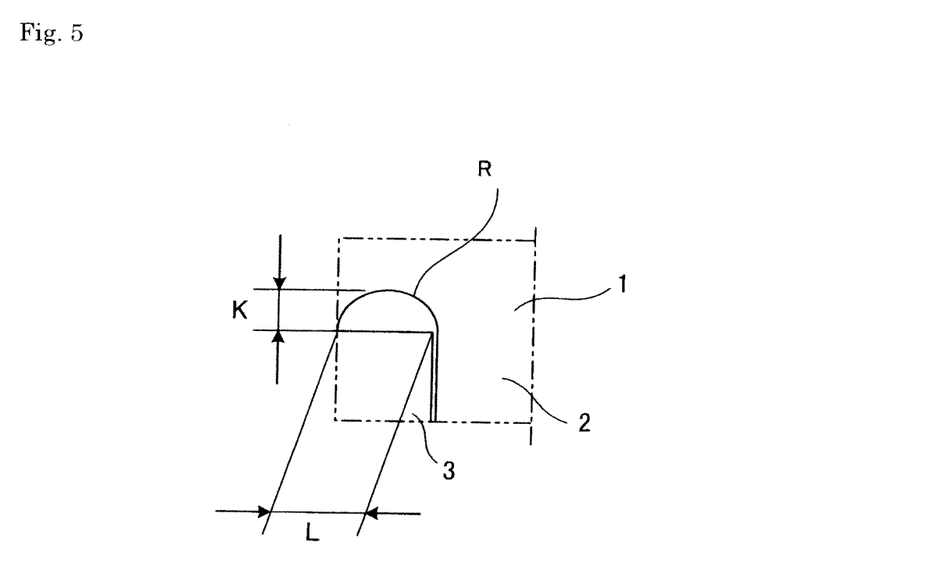
FIG. 5 is an enlarged view of a curved portion R in a conventional structure.

As described above, although the Round portion R according to the second embodiment has a cave K at the magnetic convex portion (d-axis) and the width S for widening the key groove, the width S for widening the key groove 21 is shorter than the distance L of the Round portion R at the bottom surface along a peripheral direction in the conventional structure as shown in FIG. 5 (see FIG. 7 and FIG. 8). Therefore, a reduction of the fasten area can be save as minimum as possible. The cave (a height of a radius of the curvature along a radius direction) K at the magnetic path can become as short as possible. Further, the Round portion R according to the second embodiment is shifted to the upper portion comparing to the structure as shown in FIG. 3 so that a depth of the groove key can become shallower than that of the conventional structure as shown in FIG. 3. Thus, a manufacturing efficiency of the present invention is superior to the conventional art. The radius of the curvature of the Round portion R can become larger so that the interference section can be larger. Thus, a high torque transmission can be accomplished.

INDUSTRY USE

The present invention relates to a rotor structure of an electric motor having a structure for positioning a shaft with respect to a rotor wherein stress can be effectively released and fastening force is certainly improved. Thus, the present invention can be broadly applicable to various fields of the industry.

EXPLANATION OF THE NUMERAL IN THE DRAWINGS

10 . . . rotor
11 . . . positioning key
R . . . concave portion (curvature)
20 . . . shaft
21 . . . key groove
30 . . . permanent magnet

The invention claimed is:

1. A rotor structure of a rotary machine, comprising:
   a shaft; and
   a rotor fastened at an outer peripheral surface of said shaft, the rotor having permanent magnets embedded therein,
   wherein a positioning key is formed at an inner peripheral wall of said rotor, said positioning key extending radially inward toward an axis of said rotor and having a bottom portion and side portions,
   wherein a key groove, into which said positioning key is fitted, is formed at an outer peripheral surface of said shaft extending radially inward toward the axis of said rotor,
   wherein a concave portion is formed with respect to both of said sides of said positioning key, respectively,
   wherein said key groove is formed at said inner wall of said rotor engaging with said bottom portion and part of said side portions, without engaging with said concave portion.

2. The rotor structure of claim 1, wherein the rotor structure has a single key groove and a single positioning key.

3. The rotor structure of claim 1, wherein said concave portion has a semi-circular shape.

4. The rotor structure of claim 1, wherein said concave portion extends into said inner peripheral wall of said rotor.

5. The rotor structure of claim 4, wherein said concave portion has a circular arc shape.

6. The rotor structure of claim 1, wherein said concave portion does not extend into said inner peripheral wall of said rotor.

7. The rotor structure of claim 6, wherein said concave portion has a semi-circular shape.

* * * * *